Feb. 1, 1955   J. E. CHESTNUTT   2,701,022
HARVESTER MACHINE WITH ADJUSTABLE SEAT
Filed Dec. 22, 1952   5 Sheets-Sheet 1

John E. Chestnutt
INVENTOR.

Feb. 1, 1955 J. E. CHESTNUTT 2,701,022
HARVESTER MACHINE WITH ADJUSTABLE SEAT
Filed Dec. 22, 1952 5 Sheets-Sheet 2

John E. Chestnutt
INVENTOR.

Feb. 1, 1955 J. E. CHESTNUTT 2,701,022
HARVESTER MACHINE WITH ADJUSTABLE SEAT
Filed Dec. 22, 1952 5 Sheets-Sheet 3
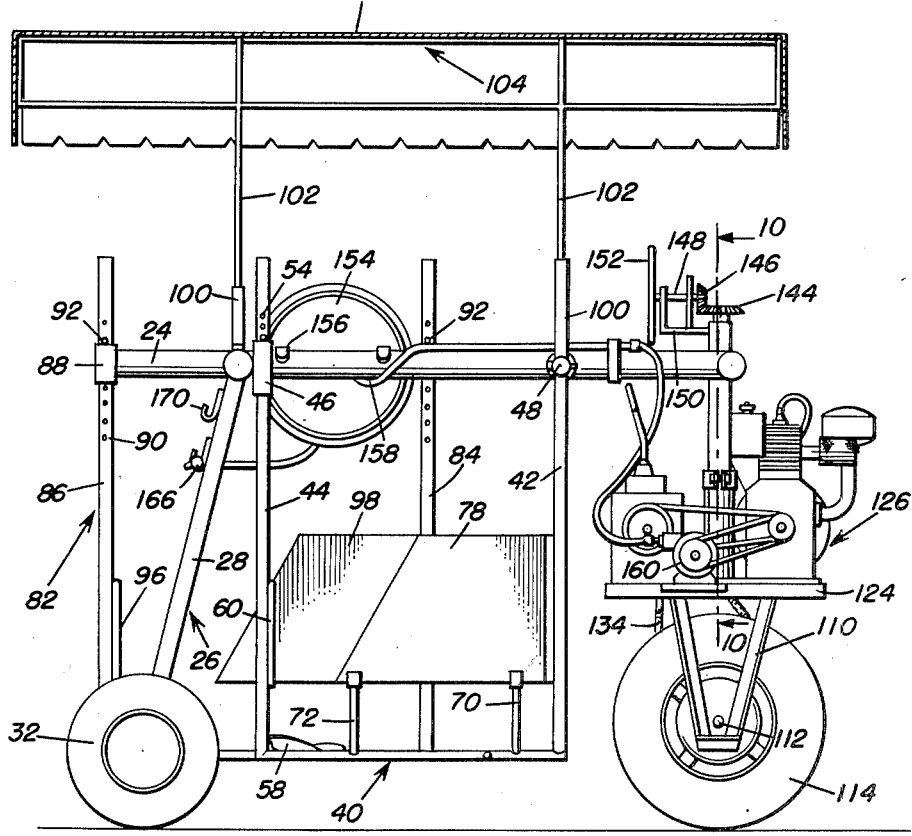
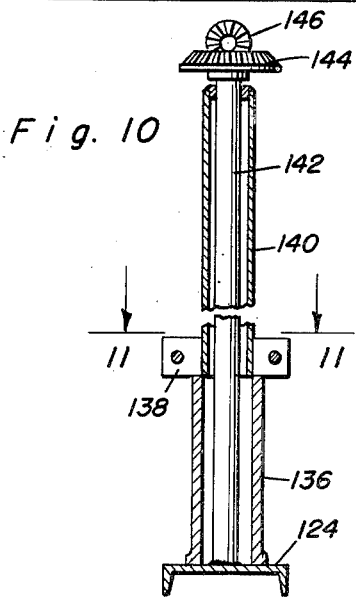
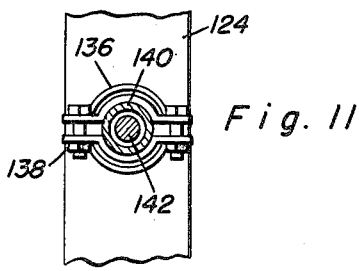
John E. Chestnutt
INVENTOR.

Feb. 1, 1955          J. E. CHESTNUTT          2,701,022
HARVESTER MACHINE WITH ADJUSTABLE SEAT
Filed Dec. 22, 1952          5 Sheets-Sheet 4

John E. Chestnutt
INVENTOR.

Feb. 1, 1955   J. E. CHESTNUTT   2,701,022
HARVESTER MACHINE WITH ADJUSTABLE SEAT
Filed Dec. 22, 1952   5 Sheets-Sheet 5
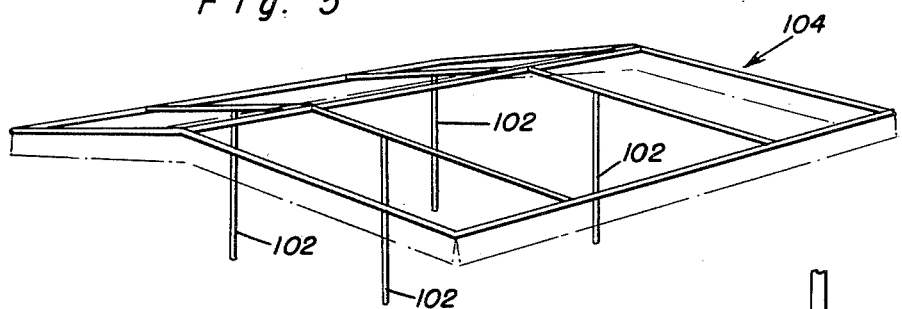
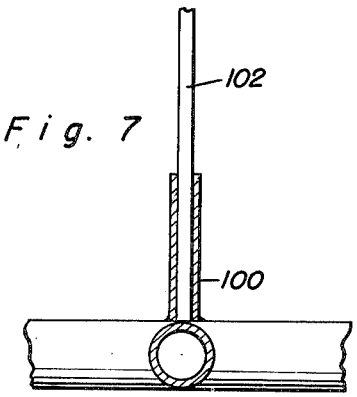
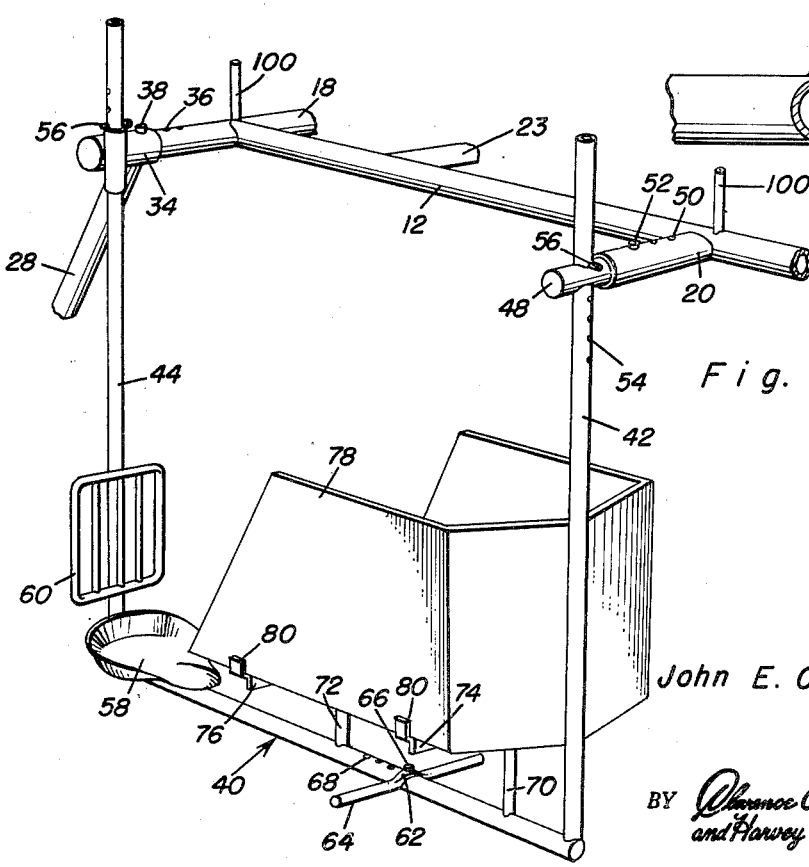
John E. Chestnutt
INVENTOR.

United States Patent Office

2,701,022
Patented Feb. 1, 1955

2,701,022

HARVESTER MACHINE WITH ADJUSTABLE SEAT

John E. Chestnutt, Ellerson, Va., assignor of one-fourth to Robert H. Ligon, one-fourth to Robert P. Kane, and one-fourth to Gordon C. Merritt Application December 22, 1952, Serial No. 327,208

5 Claims. (Cl. 180—26)

This invention relates to new and useful improvements in agricultural machines and the primary object of the present invention is to provide a powered frame that vertically adjustably supports a plurality of seat supports whereby persons on the supports may pick crops in a convenient manner as the frame is moved longitudinally of crop rows.

Another important object of the present invention is to provide an agricultural machine including a powered wheeled frame having a central and a pair of U-shaped seat supports vertically secured thereto so that two or three rows of crops may be picked by persons on the seat supports.

Another object of the present invention is to provide a harvest machine including a removable canopy that is supported over the frame to shield pickers on the seat supports.

Another object of the present invention is to provide an agricultural machine of the aforementioned character including means vertically and horizontally adjustably securing the seat supports to the frame so that the supports may be moved toward or away from each other, raised or lowered in accordance with the height of crops being picked.

A further object of the present invention is to provide a harvest machine including a front wheel mount supporting a power plant that is operatively connected to the wheel of the mount so as to propel the frame over the ground and longitudinally of rows of crops.

A still further aim of the present invention is to provide a harvest machine useful in gathering crops and which may be readily converted into a crop duster or sprayer in a convenient manner.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a side elevational view of Figure 2 and with part of the canopy broken and shown in section for the convenience of explanation;

Figure 5 is a perspective view of the canopy frame and with dotted lines showing the covering thereon;

Figure 6 is a fragmentary perspective view of the main frame and showing one of the seat supports operatively attached thereto;

Figure 7 is an enlarged detail vertical sectional view taken substantially on the plane of section line 7—7 of Figure 1 to illustrate the manner in which the canopy frame is secured to the main frame with the tube being shown in section for purposes of illustration;

Figure 10 is a vertical sectional view taken substantially on the plane of section line 10—10 of Figure 3; and, Figure 11 is a transverse horizontal sectional view taken substantially on the plane of section line 11—11 of Figure 10.

Figure 1:
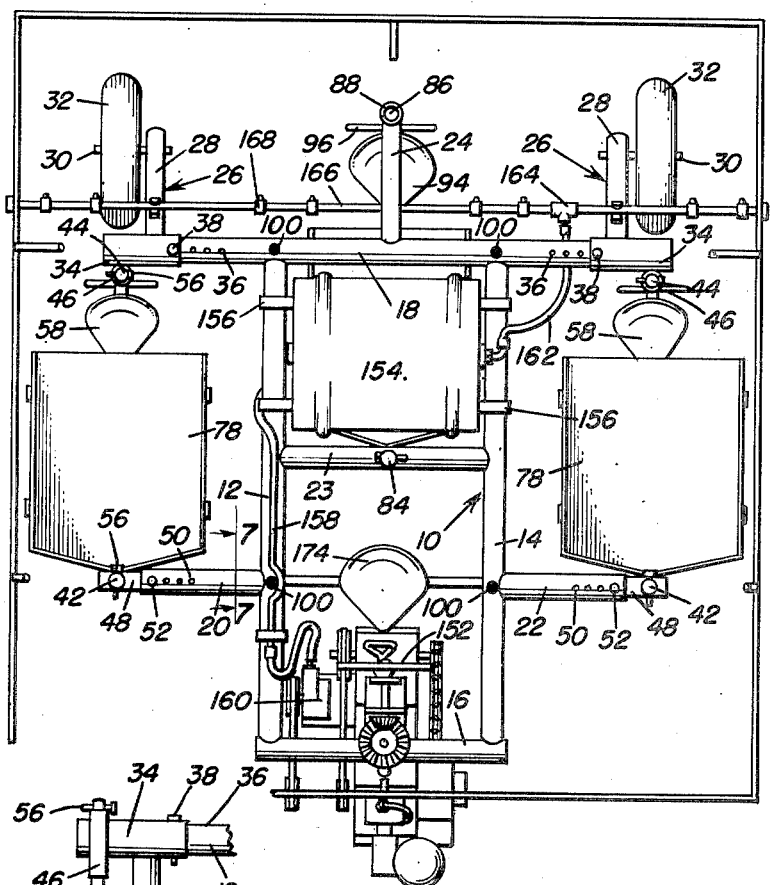
Figure 1 is a top plan view of the present invention showing the canopy covering removed.
Figure 8:
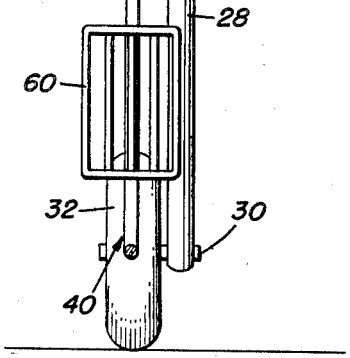
Figure 8 is a vertical sectional view of Figure 6 and with parts of the seat support broken away.
Figure 2:
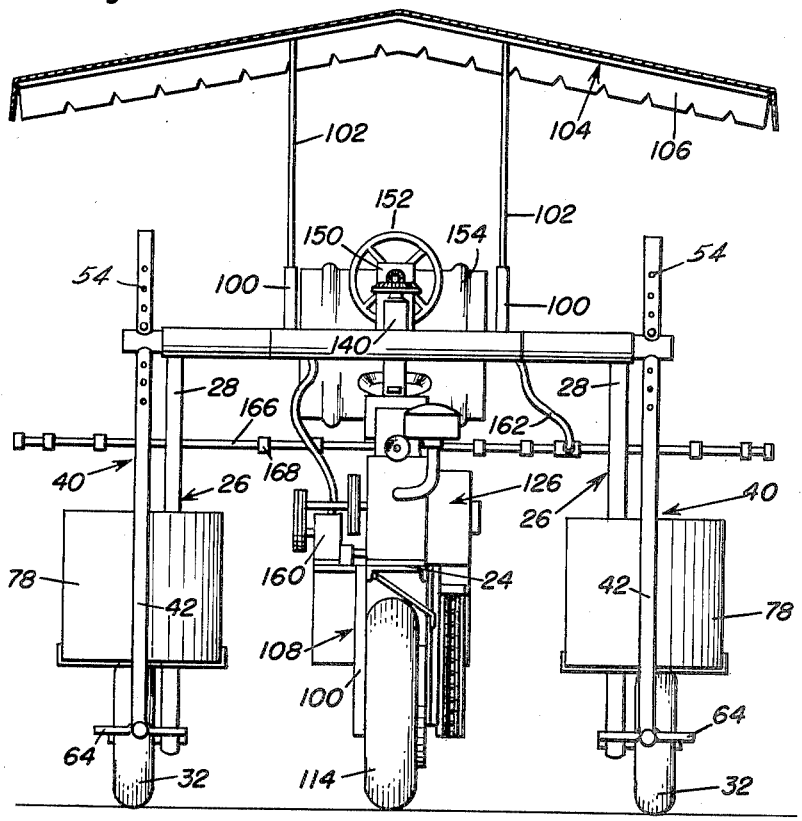
Figure 2 is a front elevational view of the present invention.
Figure 9:
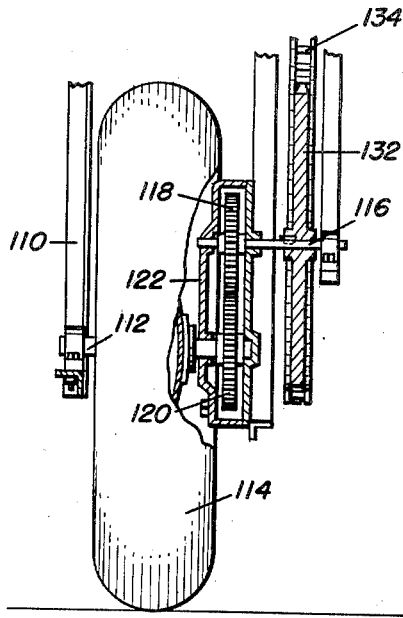
Figure 9 is an enlarged fragmentary view of Figure 2 and with parts of the forward wheel and the mount broken away for the convenience of explanation.
Figure 4:
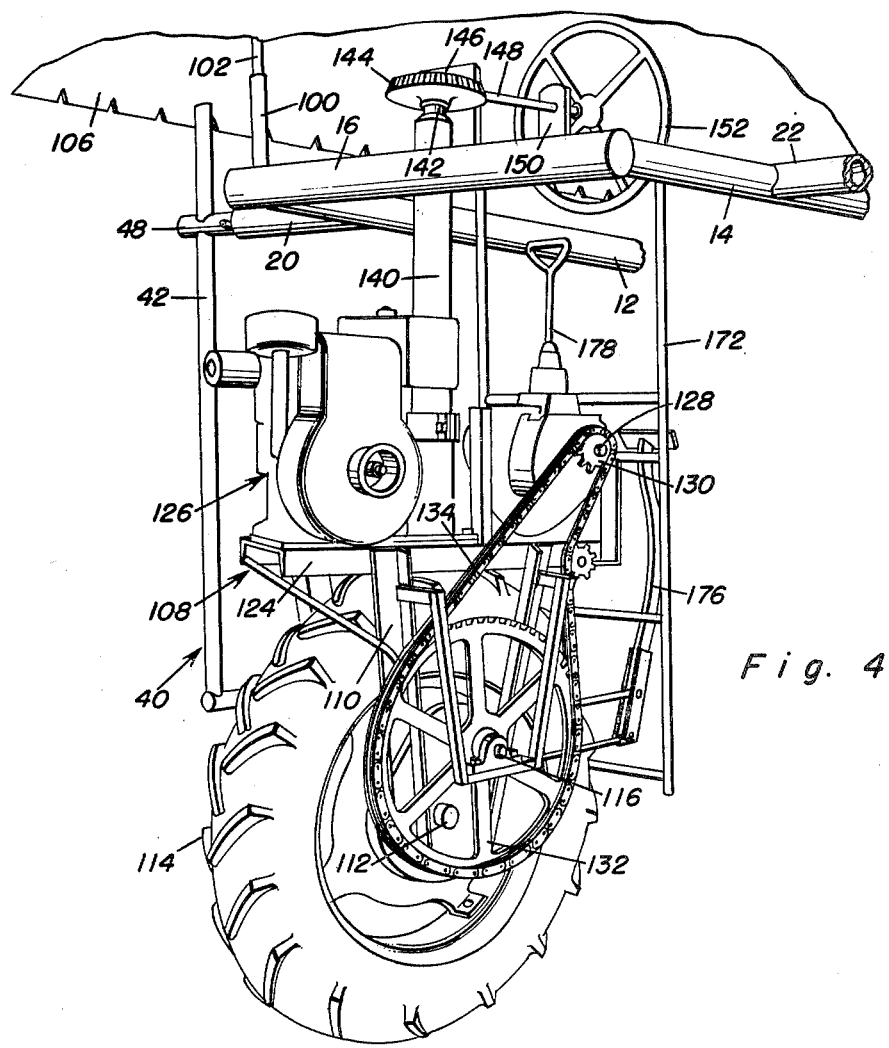
Figure 4 is a fragmentary perspective view of the front end portion of the present invention.

Referring now to the drawings in detail, wherein for the purpose of illustration, there is disclosed a preferred embodiment of the present invention, the numeral 10 represents an elongated frame preferably constructed of tubular parts and including a pair of side beams 12 and 14, forward and rear beams 16 and 18 fixed to the side beams 12 and 14, a pair of horizontal arms 20 and 22 fixed to and projecting outwardly from the side beams 12 and 14 intermediate the ends of the beams 12 and 14, a cross-member 23 fixed to the beams 12 and 14, and a rear horizontal arm 24 fixed to and projecting rearwardly from the central part of rear beam 18.

Rear wheel supports 26 are attached to and support the rear end portion of the frame 10. The wheel supports 26 each include an elongated rail 28 having a lower end that carries a stub axle 30 for a rear wheel 32. Horizontal tubes 34 are fixed by welding or the like to the upper ends of the rails 28. Tubes 34 are telescoped over the outwardly projecting ends of the rear beam 18. The ends of the beam 18 are provided with longitudinally spaced apertures 36 for registering with transverse apertures in the tubes 34 so that pins 38 may be extended through the apertures in the tubes 34 and selected apertures 36 for adjusting the tubes 34 longitudinally and horizontally on the ends of beam 18 for the purpose of adjusting the wheel supports 26 selectively toward and away from each other to clear rows of crops.

A pair of U-shaped side seat supports 40 are carried by frame 10. The supports 40 are provided with forward and rear vertical portions 42 and 44. Vertical sleeves 46 fixed by welding or the like to the tubes 34 slidably received the upper ends of rear vertical portions 44. Bars 48 are slidably received in the outer ends of arms 20 and are provided with vertical openings slidably receiving the upper ends of forward vertical portions 42. Arms 20 and 22 are formed with spaced vertical apertures 50 for selectively registering with apertures in the bars 48 so that pins 52 may be extended through selected apertures 50 and the apertures in bars 48 to adjust the bars 48 longitudinally of the arms 20.

The upper ends of vertical portions 42 and 44 are provided with longitudinally spaced horizontal apertures 54 for selectively receiving pins 56. The pins 56 carried by portions 42 will engage the upper surfaces of bars 48 and the pins 56 carried by the portions 44 will engage the upper ends of sleeves 46 to retain the supports 40 vertically adjusted relative to the frame 10.

Seats 58 are fixed to the horizontal portions of the supports 40 in front of back rests 60 fixed to the lower ends of rear vertical portions 44. The central saddle portions 62 of horizontal foot rests 64 engage over the horizontal portions of supports 40 and removably engage pins 66 that will extend downwardly through selected longitudinally spaced apertures 68 in the horizontal portions of the support 40 to adjust the foot rests relative to the seats 58.

Forward and rear vertical bars 70 and 72 are fixed to and extend upwardly from the horizontal portions of supports 40. Horizontal angle iron bars 74 and 76 are centrally fixed to the upper ends of bars 70 and 72 and support troughs 78 having open rear ends facing the vertical portions 44 so that persons on the seats 58 may place picked crops, such as tobacco leaves, into the troughs 78. The ends of the bars 74 and 76 are turned upwardly to provide stops 80 engaging the side walls of the troughs 78 to prevent sliding of the troughs 78 on the bars 74 and 76.

A central U-shaped seat support 82 is vertically adjustably secured to frame 10 and includes forward and rear vertical portions 84 and 86. Cross-member 23 is provided with a central vertical opening slidably receiving the portion 84 and a vertical sleeve 88 fixed to arm 24 slidably receives the vertical portion 86. The upper ends of the portions 84 and 86 are formed with vertically spaced horizontal apertures 90 for selectively receiving pins 92. The pin 92 carried by portion 84 will engage upon member 23 and a pin 92 carried by portion 86 will engage the upper end of sleeve 88 to vertically adjust the support 82 relative to frame 10.

A seat 94 is fixed to the horizontal portion of support 82 in front of a back rest 96 fixed to the lower end of portion 86. The horizontal portion of support 82 carries the bars 70, 72, 74, and 76 similar to supports 40 whereby a central trough 98 will be removably supported on the support 82 with the rear open end of trough 98 facing rearwardly.

Vertical tubes 100 are fixed to and extend upwardly from the forward and rear ends of frame 10 and receive the lower ends of vertical rods 102 of a canopy frame or support 104. Frame 104 extends completely over frame 10 and has a covering 106 suitably fixed thereto for shielding persons on the seats 58 and 96. The canopy frame 104 may be removed from main frame 10 by merely raising the rods 102 from the tubes 100.

A forward wheel mount 108 supports the forward end of frame 10 and includes a frame member 110 having a lower portion that rotatably supports an axle 112 having a forward wheel 114 thereon. Frame member 110 also rotatably supports a horizontal shaft 116 paralleling the axle 112 and having a gear 118 fixed thereon that meshes with a gear 120 fixed adjacent one end of axle 112. A casing 122 secured to frame member 110 conceals the gears 118 and 120 and prevents dust or dirt from collecting on these gears.

A platform 124 is fixed to the upper end of the frame member 110 and supports a power plant 126 including a drive shaft 128 having a sprocket 130 fixed thereon that is connected to a relatively large sprocket 132 keyed on shaft 116 by an endless sprocket chain 134.

A tubular column 136 is secured to and extends upwardly from the platform 124 and supports a clamp 138 at its upper end that extends about the lower end of a vertical bearing tube 140 which is secured to forward beam 16. A vertical steering rod 142 extends axially through the column 136 and tube 140 and has its lower end fixed by welding or the like to the platform 124. The upper end of rod 142 fixedly supports a beveled gear 144 that meshes with a beveled gear 146 on the forward end of a horizontal shaft 148 journaled in a bearing 150 fixed to the tube 140. The rear end of shaft 148 carries a steering wheel 152 that is manually rotated to turn the platform 124 and frame member 110 for steering the frame 10.

A tank 154 is removably supported upon frame 10 between the rear ends of beams 12 and 14 and is provided with end brackets 156 that seat upon the beams 12 and 14. One end of tank 154 is provided with an inlet nipple that is connected to a conduit 158 extending from a pump 160 supported on platform 24. Pump 160 is operatively connected to power plant 126 by suitable means. The other end of tank 154 is provided with an outlet nipple that is connected by a flexible tube 162 to a T-fitting 164 in a spray pipe or conduit 166 having longitudinally spaced spray nozzles 168. The rails 28 of supports 26 fixedly carry longitudinally spaced holding hooks 170 upon which the pipe 166 may be selectively supported depending upon the height of crops to be sprayed by a spraying liquid or powder forced from the tank and out the pipe 166 by pump 160.

A ladder 172 is suitably fixed to frame 10 behind the mount 108 so that a driver may ascend to a seat 174 supported by frame 10 to manipulate the steering wheel 152, the brake pedal 176 for wheel 114 and the shift lever 178 of power plant 126.

In practical use of the present invention, the central support 82 is removed when the machine is employed for picking two rows of crops. However, when three rows of crops are being picked, the central support 82 is applied to the frame 10 thus described.

Inasmuch as the seat supports 40 and 82 are vertically adjustable, the device is adaptable for use in picking crops of various heights. Also, as the side seat supports 40 are horizontally adjustably secured upon the frame 10 and may be moved toward and away from each other together with the rear wheels 32, the machine is capable of picking crops wherein the rows of crops are spaced apart at varying distances.

The pickers will be seated upon the seats 58 and 94 with their backs against the rests 60 and 96 and their feet upon the rests 64 as the frame 10 is moved forwardly. The pickers will remove the crops of fruit, tobacco, and the like and place the removed product into the troughs 78 and 98 until the troughs have been filled. Then the troughs are removed from the supports 40 and emptied or new troughs applied upon the bars 74, 76.

Obviously, the harvesting machine thus disclosed is not restricted to use with one, two or three rows since the side arms 20 and 22 and the rear beam 18 may be extended to accommodate additional U-shaped seat supports. The supports and troughs are quickly and readily removed from the wheeled frame when the apparatus is used for dusting and spraying.

What is claimed as new is as follows:

1. An agricultural machine comprising an elongated frame having a pair of longitudinal side beams and forward and rear transverse beams fixed to said side beams, the ends of said rear beam projecting outwardly from the side beams and horizontally supporting arms fixed to and projecting outwardly from the side beams in spaced relation to the ends thereof and paralleling said rear beam, a pair of U-shaped seat supports having forward and rear vertical portions, means vertically adjustably securing said forward and rear vertical portions to the ends of the rear beam and said arms respectively, a seat fixed to each support, a removable trough carried by each support in front of the seats, a forward wheel mount operatively connected to the forward end of the frame, and rear wheel supports operatively connected to the rear end of the frame, a cross-member fixed to said side beams and forming part of said frame, a rear horizontal arm fixed centrally to the rear beam and projecting rearwardly therefrom, a central U-shaped seat support rearwardly off-set relative to said pair of seat supports and having forward and rear vertical portions, means vertically adjustably securing the rear vertical portion of said central support to said rear arm, and means vertically adjustably securing the forward vertical portion of said central support to said cross-member.

2. An agricultural machine comprising an elongated frame having a pair of longitudinal side beams and forward and rear transverse beams fixed to said side beams, the ends of said rear beam projecting outwardly from the side beams, and horizontal supporting arms fixed to and projecting outwardly from the side beams in spaced relation to the ends thereof and paralleling said rear beam, a pair of rear wheel supports each of which includes an elongated rail having upper and lower ends, a wheel supported on the lower end of each rail, a horizontal tube slidably adjustably telescoped over each end of the rear beam and fixed to the upper ends of said rails, a forward wheel support operatively connected to the frame, a pair of U-shaped seat supports each having forward and rear vertical portions, means vertically and horizontally adjustably securing said forward vertical portions to said arms, and means vertically adjustably securing said rear vertical portions to said horizontal tubes, a cross-member fixed to said side beams and forming part of said frame, a rear horizontal arm fixed centrally to the rear beam and projecting rearwardly therefrom, a central U-shaped seat support rearwardly off-set relative to said pair of seat supports and having forward and rear vertical portions, means vertically adjustably securing the rear vertical portion of said central support to said rear arm, and means vertically adjustably securing the forward vertical portion of said central support to said cross-member.

3. An agricultural machine comprising an elongated frame having a pair of longitudinal side beams and forward and rear transverse beams fixed to said side beams, the ends of said rear beam projecting outwardly from the side beams and horizontal supporting arms fixed to and projecting outwardly from the side beams in spaced relation to the ends thereof and paralleling said rear beam, a pair of rear wheel supports each of which includes an elongated rail having upper and lower ends, a wheel supported on the lower end of each rail, a horizontal tube slidably adjustably telescoped over each end of the rear beam and fixed to the upper ends of said rails, a forward wheel support operatively connected to the frame, a pair of U-shaped seat supports each having forward and rear vertical portions, a vertical sleeve fixed to each horizontal tube, said sleeves slidably receiving the rear vertical portions of said seat supports, the rear vertical portions of said seat supports having upper ends with longitudinally spaced transverse apertures, removable pins extending through selected apertures in said rear vertical portions of said seat supports engaging the upper ends of said sleeves, bars horizontally slidably adjustably secured in said arms and each having a vertical opening, said vertical forward portions of said seat supports having upper ends slidably received in said openings and provided with vertically spaced horizontal apertures, and adjusting pins removably positioned in selected apertures in said forward vertical portions engaging the upper surfaces of said bars.

4. An agricultural machine comprising an elongated frame including a pair of longitudinal side beams, forward and rear transverse beams fixed to the side beams, a pair of arms fixed to the side beams and projecting laterally outwardly therefrom, a cross-member fixed to said side beam, and a rear arm fixed to and projecting rearwardly from the center of the rear beam, said rear beam having ends projecting outwardly beyond the side beams in parallel relation to the pair of arms, a pair of rear wheel supports each having a rail with upper and lower ends, wheels supported on the lower ends of said rails, horizontal tubes telescoped over the ends of said rear beam, means longitudinally adjusting the tubes on the ends of said rear beam, said rails having upper ends fixed to said tubes, a pair of U-shaped side seat supports each having a forward vertical portion and a rear vertical portion, means vertically and horizontally adjustably securing the forward vertical portions of said seat supports to said pair of arms, means vertically adjustably securing said rear vertical portions to said tubes, a central U-shaped seat support having forward and rear vertical portions, means vertically adjustably securing the forward vertical portion of said central seat support to the cross-member, means vertically adjustably securing the rear vertical portion of said central seat support to said rear arm, and a front steering power driven wheel operatively connected to the frame.

5. An agricultural machine comprising an elongated frame including a pair of longitudinal side beams, forward and rear transverse beams fixed to the side beams, a pair of arms fixed to the side beams and projecting laterally outwardly, a cross-member fixed to said side beams, and a rear arm fixed to and projecting rearwardly from the center of the rear beam, said rear beam having ends projecting outwardly beyond the side beams in parallel relation to the pair of arms, a pair of rear wheel supports each having a rail with upper and lower ends, wheels supported on the lower ends of said rails, horizontal tubes telescoped over the ends of said rear beam, means longitudinally adjusting the tubes on the ends of said rear beam, said rails having upper ends fixed to said tubes, a pair of U-shaped side seat supports each having a forward vertical portion and a rear vertical portion, means vertically and horizontally adjustably securing the forward vertical portions of said seat supports to said pair of arms, means vertically adjustably securing said rear vertical portions to said tubes, a central U-shaped seat support having forward and rear vertical portions, means vertically adjustably securing the forward vertical portion of said central seat support to the cross-member, means vertically adjustably securing the rear vertical portion of said central seat support to said rear arm, a frame member under the forward end of said frame, an axle carried by said frame member, a forward wheel on said axle, a platform overlying and fixed to the frame member, a motor on the platform operatively connected to said axle, and a steering means carried by the forward beam operatively connected to the platform.

References Cited in the file of this patent

UNITED STATES PATENTS

| | | |
|---|---|---|
| 1,370,347 | Nelson | Mar. 1, 1921 |
| 2,504,403 | Finley | Apr. 18, 1950 |
| 2,518,418 | Chickering | Aug. 8, 1950 |
| 2,526,583 | Schlessman | Oct. 17, 1950 |
| 2,604,332 | Kent | July 22, 1952 |
| 2,637,263 | Schmitz | May 5, 1953 |